Aug. 12, 1930.  T. F. BARRY  1,772,744
TACKLE BOX
Filed May 17, 1928.  2 Sheets-Sheet 1
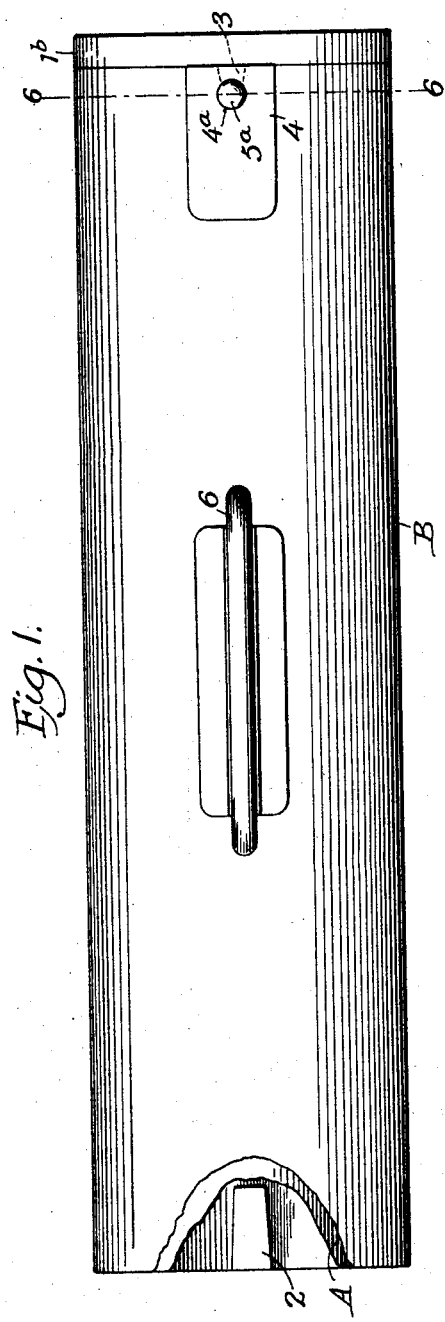
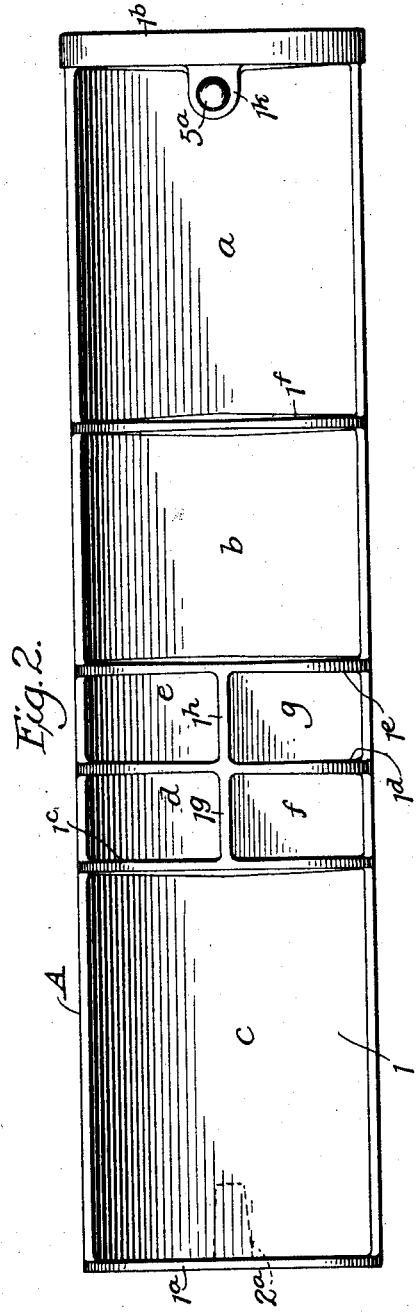
INVENTOR.
Thomas F. Barry
BY
Alexander Lowell
ATTORNEYS Aug. 12, 1930. T. F. BARRY 1,772,744
TACKLE BOX
Filed May 17, 1928 2 Sheets-Sheet 2
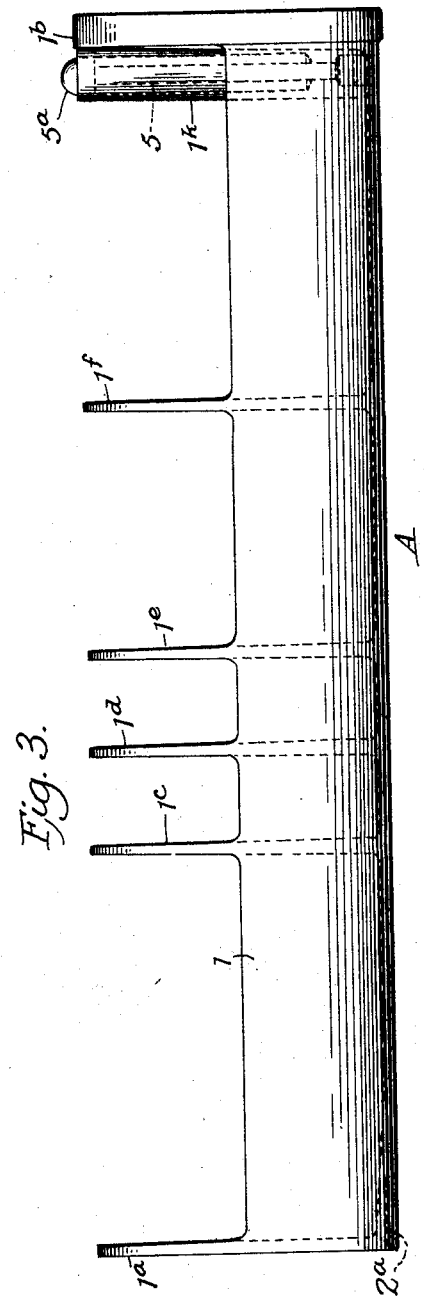
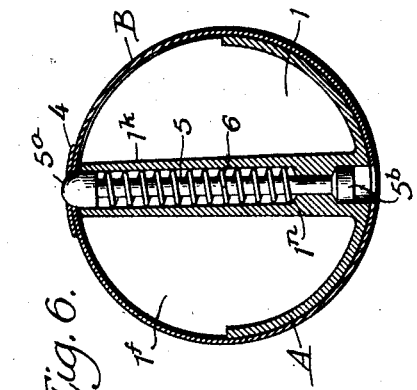
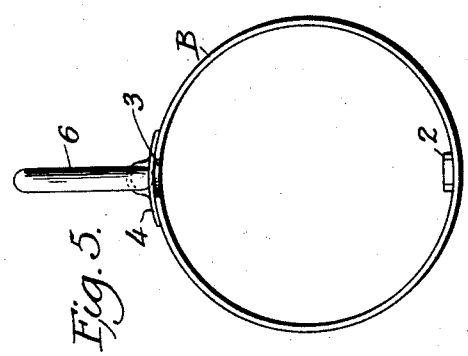
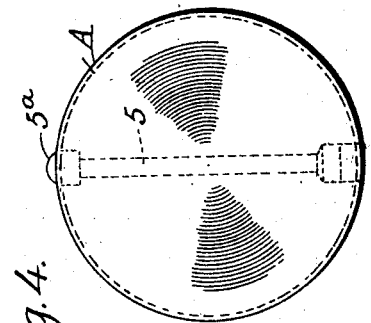
INVENTOR.
Thomas F. Barry
BY
ATTORNEYS Patented Aug. 12, 1930

1,772,744

UNITED STATES PATENT OFFICE

THOMAS F. BARRY, OF MUSCATINE, IOWA

TACKLE BOX

Application filed May 17, 1928. Serial No. 278,551.

This invention is an improved box for fishing tackle or equipment.

The present types of tackle boxes do not properly protect the more delicate equipment; do not permit quick and complete inspection of the contained equipment without disarrangement of same; and do not prevent troublesome mixing of the tackle or equipment.

The ordinary tackle boxes must be carefully carried or transported in an upright position; and kept locked to prevent accidental opening of the box, and loss, or mixing, of its contents. Such boxes are easily damaged by bending or denting; which interferes with the proper operation of the covers and trays. Such ordinary tackle boxes also are locked with a snap lock or padlock which often will not function because of wear or damage, and allow the box to accidentally open and spill the contents; often in water or where they cannot be retrieved; and also allow the contents to become mixed, and the keys of such boxes are frequently mislaid or lost.

My invention provides a fishing tackle or equipment box free from the numerous objections to the ordinary boxes above noted.

In my invention the box is so constructed that it will prevent mixing or disarrangement of the contents during transportation; or in storage; will be automatically and securely locked when closed, without use of snap lock or padlock or keys; and will remain positively locked until the user desires to open same, which opening can be effected simply as hereinafter described.

My invention also provides a box which when open permits full inspection of the contents without displacement or disarrangement thereof; and which box can be conveniently carried or transported in any position; is attractive in appearance, easy to transport, easy to clean, resistant to rust and depreciation, light, and durable.

In the accompanying drawings I have shown one practical embodiment of the invention and will explain the same with reference to said drawings; and summarize in the claims the essentials of the invention and novel features of construction and combinations of parts for which protection is desired.

Fig. 1 is a view of the complete box closed.
Fig. 2 is a top plan view of the container removed from the casing.
Fig. 3 is a side view of the container.
Fig. 4 is an end view of the container.
Fig. 5 is an end view of the casing.
Fig. 6 is a cross sectional view of the container and casing on the line 6—6, Fig. 1.

The box comprises an outer member or casing B and an inner member or container A, shown detached in Figs. 2, 3 and 4.

The container A is preferably cast or fabricated out of aluminum or some rustless metal material. Said container has a hollow trough portion 1 preferably semi-cylindric in cross section and closed at its ends by heads $1^a$ and $1^b$, such heads being preferably circular. The trough portion 1 is also divided by spaced transverse partitions $1^c$, $1^d$, $1^e$, $1^f$ by which it is divided into a plurality of separated compartments. Preferably the spaces between the partitions $1^c$ and $1^e$ are further divided by longitudinally disposed partitions $1^g$ and $1^h$, which are preferably arranged in the center line of the part 1.

In the construction shown the container is divided by said partitions into three large compartments $a$, $b$ and $c$, and four small compartments $d$, $e$, $f$ and $g$. The partitions or divisions in the container are preferably arranged as shown in Figs. 2 and 3, but they may be otherwise arranged or varied in number; the partitions being arranged to provide a plurality of compartments of various shapes and sizes to suit the various equipment or materials which are to be placed in the container.

The container A is adapted to telescope within the casing member B; which casing may be made from any suitable metal or material and is preferably cylindric in cross section. Its interior diameter and contour should however conform to the exterior diameter and contour of the end walls $1^a$, $1^b$ and partitions $1^c$, $1^d$, $1^e$ and $1^f$, so that when the container is telescoped into the casing as shown in Fig. 1 the various compartments will be securely closed and the contents of one compartment can not escape into another compartment. Thus confusion and mixing of the goods in the container is prevented no matter in what position the box may be placed.

The casing is provided on its inner side adjacent one end with a tapered key 2 which is adapted to engage a tapered keyway 2ª in the end of container 1 adjacent head 1ª. At the other end the casing is provided with a tapered slot 3 which is preferably overlaid by a plate or projection 4 fastened to or forming part of the casing; said plate having an opening 4ª adjacent the inner end of the slot 3. The slot 3 is adapted to guide the head 5ª of a bolt 5 into engagement with the opening 4ª when the container is inserted in the casing. The bolt 5 is mounted and guided in a socket formed in a projection 1ᵏ on the inner wall of the head 1ᵇ.

The head 5ª of bolt 5 is rounded on its upper end, and said bolt is normally pressed upward by a spring 6 interposed between the head 5ª and a shoulder 1ⁿ at the lower end of the socket, through which the shank of the bolt 5 extends; the bolt being confined in the socket by a head 5ᵇ on its lower end which moves in the outer end of the socket, see Figs. 3 and 6. The spring 6 normally projects the head 5ª of the bolt so that it will engage the hole 4ª in the plate when the container is properly positioned in the casing, and thereby the container will be automatically and securely locked in the casing when inserted therein. The tapered key 2 engaging the recess 2ª, and the guide 3 engaging the head 5ª of bolt 5, insure the proper positioning of the container within the casing and the engagement of the head 5ª with the hole 4ª, the latter locking the casing in the container.

When it is desired to remove the container it is only necessary to depress head 5ª out of hole 4ª and simultaneously pull out the container by means of head 1ᵇ. The container is exteriorly machined to fit closely in the casing and enough friction is caused by the snugness of this fit to prevent the container sliding from the casing when the parts are in locked position, except when the user desires to open the box.

The casing B may be provided with a handle 6 of any suitable construction and may be externally fitted or finished as desired.

While I have shown the casing and container as practically circular in cross section their size and their cross sectional area may be varied, to suit the maker and the character and number of objects to be carried therein.

In order to remove the casing the head 5ª can be depressed by the thumb or finger so as to clear it from the opening 4ª sufficiently to allow the rounded surface of the head to ride under the edge of the opening. The container can then be readily withdrawn from the casing. The inner wall 1ª of the container would close the end of the casing opposite head 1ᵇ when the container is inserted therein. If desired the end of the casing adjacent the key 2 could be closed.

The partitions or divisions of the container are more than mere partitions; as they extend above the top longitudinal edges of the trough 1 and their upper edges will contact at all times with the inside wall of the casing, and maintain the container in place in the casing, and at the same time form complete barriers between one compartment and the next.

Various articles can be placed in the various compartments of the container, and the latter then inserted in the casing by telescoping them together as is obvious. The head 1ᵇ is preferably of slightly larger diameter than the casing so that it can not enter the latter, and thus it limits the telescoping of the container and casing, and also provides a hand hold by which the container can be readily grasped when it is desired to remove the container from the casing.

I claim:

1. A box of the character specified comprising a tubular casing; and a trough like container adapted to telescope in the casing; said container being provided with end members and intermediate partition members which divide the box into separate compartments when the container is inserted within the casing, said casing having an internal key, and said container having a slot adapted to engage the key to properly position the container in the casing.

2. A box of the character specified comprising a tubular casing; and a trough like container adapted to telescope in the casing; said container being provided with end members and intermediate partition members which divide the box into separate compartments when the container is inserted within the casing, said casing having an opening adjacent one end and a spring bolt mounted on the container adapted to engage said opening when the container is telescoped in the casing.

3. A box of the character specified comprising a tubular casing; and a trough like container adapted to telescope in the casing; said container being provided with end members and intermediate partition members which divide the box into separate compartments when the container is inserted within the casing, said casing having an internal key adjacent one end, a guide slot adjacent its other end, and an opening at the inner end of said guide slot; and said container having a slot adapted to engage said key, and a spring pressed bolt adapted to be directed by said guide slot into engagement with said opening.

4. A box of the character specified comprising a tubular casing; and a hollow semi-cylindric container adapted to telescope in the casing and provided with a series of end members and intermediate and longitudinal partition members extending above the side walls of the container and corresponding in external contour with the internal contour of the casing; said partition members dividing the container into a plurality of compartments and preventing commingling of materials in the different compartments when the container is inserted within the casing.

5. In a box as set forth in claim 4, the casing having an internal key, and the container having a slot adapted to engage the key to properly position the container in the casing.

6. In a box as set forth in claim 4, said casing having an opening adjacent one end and a spring bolt mounted on one head of the container adapted to engage said opening when the container is telescoped in the casing.

7. In a box as set forth in claim 4, said casing having an internal key adjacent one end, a tapered guide slot at its other end, and an opening at the inner end of said guide slot; and said container having a slot adapted to engage said key, and a spring pressed bolt adapted to be directed by said guide slot into engagement with said opening.

8. A box for the purpose specified comprising a tubular casing having an internal key adjacent one end, a tapered guide slot at its other end, and an opening at the inner end of said guide slot; and a hollow semi-cylindric container adapted to telescope in the casing and provided with end members and intermediate partition members extending above the side walls of the container, said members corresponding in external contour with the internal contour of the casing, said partition members dividing the container into a plurality of compartments, said container having a slot adapted to engage said key, and a spring pressed bolt mounted on one head of the container and adapted to be directed by said guide slot into engagement with said opening when the container is inserted within the casing.

THOMAS F. BARRY.